US009876361B2

(12) United States Patent
Ploett

(10) Patent No.: US 9,876,361 B2
(45) Date of Patent: Jan. 23, 2018

(54) METHOD FOR CONTROLLING THE OPERATION OF ELECTRIC ENERGY GENERATORS AND CONTROL DEVICE FOR PERFORMING THE METHOD

(71) Applicant: SIEMENS AKTIENGESELLSCHAFT, Munich (DE)

(72) Inventor: Norbert Ploett, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 280 days.

(21) Appl. No.: 14/651,324

(22) PCT Filed: Dec. 11, 2012

(86) PCT No.: PCT/EP2012/075045
§ 371 (c)(1),
(2) Date: Jun. 11, 2015

(87) PCT Pub. No.: WO2014/090285
PCT Pub. Date: Jun. 19, 2014

(65) Prior Publication Data
US 2015/0303697 A1 Oct. 22, 2015

(51) Int. Cl.
*H02J 3/46* (2006.01)
*G05B 15/02* (2006.01)
(52) U.S. Cl.
CPC .............. *H02J 3/46* (2013.01); *G05B 15/02* (2013.01)

(58) Field of Classification Search
CPC .................................. H02J 3/46; G05B 15/02
See application file for complete search history.

(56) References Cited

U.S. PATENT DOCUMENTS 7,171,287 B2   1/2007  Weiss
8,803,362 B2   8/2014  Schmiegel
(Continued)

FOREIGN PATENT DOCUMENTS

| DE | 102009040091 A1 | 3/2011 |
|---|---|---|
| EP | 1202425 A2 | 5/2002 |
| WO | 2012048736 A1 | 4/2012 |

*Primary Examiner* — Sean Shechtman
*Assistant Examiner* — Tri T Nguyen
(74) *Attorney, Agent, or Firm* — Laurence Greenberg; Werner Stemer; Ralph Locher

(57) ABSTRACT

A method controls the operation of electric energy generators. A correction signal is sent to the control device and indicates a deviation of a current energy requirement of a supply network from a planned energy requirement. The control device transmits control signals to the energy generators, the correction signal being used for determining the control signals. To react to a correction signal, a control energy quantity is determined which indicates an energy quantity to be jointly provided by all energy generators, and a first energy generator is selected for providing a proportion of the control energy quantity. Further energy generators are sequentially selected, until the extent of the control energy quantity has been completely assigned to respective selected energy generators, and control signals are generated for the selected energy generators, which control signals indicate the proportions of the control energy quantity to be provided by the energy generators.

12 Claims, 3 Drawing Sheets

(56) References Cited

U.S. PATENT DOCUMENTS

| | | | |
|---|---|---|---|
| 2004/0164616 A1* | 8/2004 | Obayashi | B60K 6/46 307/18 |
| 2008/0231119 A1* | 9/2008 | Yeh | H02J 7/35 307/65 |
| 2008/0296976 A1* | 12/2008 | Wright | H02J 3/008 307/76 |
| 2009/0038668 A1* | 2/2009 | Plaisted | H01L 31/0521 136/244 |
| 2010/0058350 A1 | 3/2010 | Boss et al. | |
| 2010/0207454 A1* | 8/2010 | Jagota | H02J 1/10 307/80 |
| 2012/0158202 A1* | 6/2012 | Yano | H02J 3/14 700/293 |
| 2012/0239219 A1* | 9/2012 | Forbes, Jr. | G06Q 10/00 700/296 |
| 2013/0046895 A1* | 2/2013 | Metcalfe | H02J 13/0017 709/226 |
| 2013/0204451 A1 | 8/2013 | Staehle | |

\* cited by examiner

METHOD FOR CONTROLLING THE OPERATION OF ELECTRIC ENERGY GENERATORS AND CONTROL DEVICE FOR PERFORMING THE METHOD

BACKGROUND OF THE INVENTION

Field of the Invention

The invention relates to a method for controlling the operation of electric generators which are connected to an electric energy supply network to feed in electric energy and of which the mode of operation is controlled via a common control device, wherein the control device controls the energy generators using a defined characteristic in such a way that the energy fed into the supply network by the energy generators matches the planned energy requirement of the supply network, a correction signal which indicates a deviation of the current energy requirement of the supply network from the planned energy requirement of the supply network is fed to the control device, and the control device transmits control signals to the energy generators, the correction signal being used to determine the control signals.

The invention also relates to a correspondingly configured control device to control the operation of electric energy generators.

Conventionally designed electric energy supply networks are in principle configured to supply electric energy from comparatively few central energy generators, e.g. coal-fired power stations, to the end consumers. The transmission device of such energy distribution systems is essentially constant; furthermore, the energy generation is adapted to the—forecast and/or actual—energy requirement of the end consumers.

However, recent developments and political imperatives have resulted in a liberalization of the electric energy market. As a result, for some years electric energy provided by decentralized energy generators, such as e.g. wind power stations, small combined heat and power plants, biogas plants and photovoltaic plants, has increasingly been fed into the energy supply networks at medium or low voltage level, resulting in a radical change in the hitherto conventional transmission device. Since each individual decentralized energy generator can provide only a small amount of energy to feed into the energy supply network compared with a high-capacity power plant, many energy generators with a comparatively low generating output are combined for simplified control of the decentralized energy generators and for more efficient distribution of the electric energy provided by the decentralized energy generators and their electric energy is sold as a package. Such a combination of a plurality of small energy generators is also known as a "virtual power plant" (VPP).

A control characteristic or "general roadmap" is negotiated with the network operator for the entire virtual power plant on the basis of forecasts for a future energy requirement of a supply network. This general roadmap is divided up, from the perspective of the operator of the virtual power plant, into individual control characteristics or "individual roadmaps" according to which the mode of operation of the individual energy generators combined in the virtual power plant is to be controlled.

The definition of the general roadmap and the individual roadmaps and the control of the energy generators in order to adhere to the general roadmap in relation to the network operator are carried out by means of a control device of an energy management system. For example, the applicant offers a control device under the name of "DEMS" (Decentralized Energy Management System) for the operation of energy generators of a virtual power plant with which energy generators of any type can be aligned with one another in optimum fashion in terms of their respective operation. The energy generators are controlled in optimum fashion in terms of energy-related, economic and ecological aspects for this purpose. The energy generators controlled via these control devices are controlled using the individual roadmaps, which are essentially always defined on the day before the respective operation and indicate the operation of the energy generators depending on the time and are optimized according to the aforementioned aspects.

Along with the actual sale of the electric energy generated by the energy generators, the distribution of power plant capacities for the control energy also offers a useful alternative for the operator of a virtual power plant. The term "control energy" refers to the electric energy reserved by the operators of electric energy generators to compensate for short-term deviations of the energy quantity actually required by the supply network from the planned energy quantity required by the supply network. Control energy can be positive or negative here, depending on whether the requirement of the supply network turns out to be higher or lower when compared with the planned requirement.

In this case, the operator of the virtual power plant is paid, on the one, hand for making electric energy available on a call-off basis (which, if the requirement of the supply network matches the roadmap, is not called off at all). On the other hand, the operator receives an additional payment for the control energy actually called off in the short term by the network operator.

The network operator decides on the control energy call-off. If it calls off control energy, the requirement normally exists for the controller of the virtual power plant to respond within a few seconds and for the required energy actually to be fed in entirely within a few minutes. In order to request control energy, the network operator generates a correction signal which indicates a deviation of the current energy requirement of the supply network from the planned energy requirement of the supply network and which is transmitted to the control device of the virtual power plant.

The feed-in of control energy is consequently a process which is overlaid over the "normal" general roadmap and must be carried out within a short time span. A combination of control algorithms is therefore normally used for the optimum, coordinated control. Whereas comparatively slow, yet precisely operating, algorithms, with which a plurality of parameters, in particular non-constant variables also, can simultaneously be optimized, can be used for the planning phase, i.e. the determination of the general roadmap and the individual roadmaps based on the forecasts for the expected energy requirement of the network provided by the network operator, the speed of the algorithm takes precedence over its precision for the short-term response to the control energy requested by means of the correction signal. In the case of the DEMS product of the applicant, for example, an optimization method for mixed integer linear programming (MILP) is used for the planning phase. The method is mathematically very demanding and achieves excellent optimization results, but is so computationally complex that the response within seconds to a control signal, as required for the provision of the control energy, could not be represented with a commensurate computer system.

BRIEF SUMMARY OF THE INVENTION

The object of the invention is to develop a method of the aforementioned type in such a way that even control devices equipped with a comparatively low-performance computing technology can respond to a correction signal in a simple manner and in the shortest possible time in order to adapt the mode of operation of the energy generators accordingly. The object of the invention is also to indicate a correspondingly developed control device. In order to achieve this object, a generic method is developed according to the invention in such a way that the following steps are carried out by the control device: determining a control energy quantity which indicates an energy quantity to be provided jointly by all energy generators, on the basis of the correction signal, selecting a first energy generator or a first group of energy generators and determining a proportion of the control energy which is to be provided by the first energy generator or the first group of energy generators, sequentially selecting further energy generators or further groups of energy generators and determining a respective proportion of the respectively remaining amount of the control energy quantity which is to be provided by the respective further energy generator or the respective further group of energy generators until the amount of the control energy is allocated completely in each case to selected energy generators, and generating control signals for the selected energy generators which indicate the respective proportions of the control energy to be provided by the selected energy generators.

The term "energy generator" is understood in this context to refer generally to all devices and plants which generate electric energy and which can be controlled separately by a control device of an energy management system. In particular, this is understood to mean so-called decentralized energy generators with a smaller electric output than large power plants, i.e., for example, photovoltaic plants, wind power plants, combined heat and power plants, biogas plants.

Groups of energy generators can be formed by combining a plurality of energy generators of the same type to form a joint unit, e.g. a plurality of photovoltaic cells to form a solar plant or a plurality of wind turbines to form a wind energy plant. However, energy generators which have common features in terms of their control, for example in terms of whether they are controllable in a step less or stepwise manner (stepwise-controllable or switchable energy generators are frequently found where the requirement exists for energy generators to be able to be restricted to specific power levels (e.g. in Germany according to the Renewable Energy Sources Act [Erneubare Energien Gesetz—EEG]).

A "control device" is understood to mean a data processing device, for example a controller of an energy management system which is configured, on the one hand, to receive and process status information relating to the respective condition of the energy generators and, on the other hand, to transmit control commands to the energy generators. Here, a control device does not necessarily have to comprise a single device, but rather a plurality of devices (also disposed in a locally distributed manner) can also interwork as a control device, as long as they are configured to implement a common control concept to control the operation of the energy generators.

The term "control energy quantity" is understood to mean the energy quantity which, deviating from the energy quantity specified for each energy generator by its individual control characteristic ("individual roadmap") and instantaneously made available for feeding into the energy supply network, can be made available to compensate for fluctuations in the instantaneous energy requirement of the network. Depending on the deviation, the control energy quantity can be fed either positively (more energy than planned must be fed into the supply network) or negatively (less energy than planned must be fed into the supply network). The control energy quantity requested by the network operator with the correction signal corresponds to the "control energy quantity to be provided" by all energy generators jointly.

The term "energy quantity" is intended to be understood to mean an energy quantity in relation to a specific time period (e.g. one quarter of an hour). Strictly speaking, the energy quantity therefore has the unit of an electrical output. Outputs can therefore also be used instead of energy quantities in connection with the method according to the invention and the control device according to the invention, and the term "energy quantity" is consequently intended to comprise both alternatives. The same applies accordingly to all compound terms, for example the "control energy quantity".

The particular advantage of the method according to the invention consists in that no complex parallel optimization of the mode of operation of the energy generators needs to be carried out here, but instead the requested control energy quantity is divided sequentially among the energy generators or groups of energy generators. The method according to the invention is thus simplified to the extent that it can be carried out even with control devices with moderate processing power in an acceptable time and can be formulated with relatively simple programming means, e.g. with the ST ("Structured Text") programming language according to IEC standard IEC 61131 which is suitable for stored program control (SPC). For example, iterations and loops are completely (or at least largely) avoided in the method sequence due to the sequential structure. In addition, due to its largely modular structure, the method can be flexibly adapted to the number of existing energy generators (high scalability).

According to one advantageous development of the method according to the invention, it is provided that the control device, in order to determine the sign of the control energy quantity, examines the correction signal to determine whether it indicates a positive or negative deviation of the current energy requirement of the supply network from the planned energy requirement of the supply network.

Through the determination of the sign of the required control energy quantity on the basis of the correction signal, it is specified whether the energy generators must provide more or less energy than planned in response to the changed energy requirements of the network. Depending on the sign of the required control energy quantity, the control device can select suitable energy generators in order to provide the control energy in an optimum manner.

According to a first preferred embodiment of the method according to the invention, it can be provided that the energy generators are sorted by the control device with the formation of a sequence list relating to the costs incurred if the respective energy generators are operated deviating from a control characteristic specific to each energy generator defined on the basis of the control characteristic, and the sequence list is used in order to select the first energy generator or the first group of energy generators and the at least one further energy generator or the at least one further group of energy generators.

In this way, the so-called "marginal costs" i.e. the costs incurred or saved in the event of a deviation of the individual energy generators from their operation according to the roadmap, can be taken into account in defining the mode of operation of the energy generators by the control device. For example, in the event of a request for a positive control energy quantity, the energy generators can be used in an ascending cost order to cover the required control energy quantity (i.e. first those energy generators in the case of which an increase in the energy generation incurs comparatively low costs), whereas, in the event of a request for a negative control energy quantity, they are used in a descending cost order (i.e. first those energy generators in the case of which a reduction in the energy generation is associated with comparatively high cost savings). This first embodiment is suitable, in particular, in the case of variable marginal costs, i.e. the marginal costs cannot be permanently allocated to an energy generator, but are to be determined depending on other operating parameters (e.g. type and costs of the primary energy, instantaneous utilization and instantaneous efficiency of the energy generators, $CO_2$ emissions of the energy generator, etc.). The sorting of the energy generators can be effected here continuously or can be triggered by specific events (e.g. at the end of a specific time, following the incorporation of a new energy generator, in response to a request from one of the energy generators, etc.).

In connection with this first embodiment, it is provided according to an advantageous development of the method according to the invention that the control device defines the maximum control energy quantity providable in total by the energy generators as the sum of the respective individual control energy quantities providable by each individual energy generator.

On the basis of this indication determined in this way in respect of the total (positive or negative) control energy quantity that can actually be provided by the energy generators, the control device can influence further method sequences, e.g. the quantity of the control energy to be provided by an individual energy generator can be determined depending on its maximum providable control energy quantity, or an error signal can be generated if the maximum control energy providable by all energy generators is not sufficient to attain the required control energy quantity.

According to a further advantageous development of the method according to the invention in connection with the first embodiment, it can furthermore be provided that the control device generates the control signals depending on an optimization parameter specified by a user according to a cost-optimized or according to a time-optimized mode of operation.

Here, it can advantageously be specified by a user of the control device (for example an operator of a virtual power plant to which the energy generators belong) whether the selection of the energy generators is to be made according to cost or time aspects. A mixed form is also conceivable here, for example in such a way that the time-optimized mode of operation of the energy generators is initially selected for a fast response to a correction signal, in order to then change over to a cost-optimized mode of operation.

It can, for example, be specifically provided in this context that, in the case of the cost-optimized mode of operation, the control device in each case allocates the maximum energy quantity providable by the respective energy generator or the group of energy generators to the first energy generator or the first group of energy generators and the respective at least one further energy generator or the respective at least one further group of energy generators as the proportion of the control energy quantity to be provided.

With this mode of operation, in the case of a positive control energy request, the energy generators are successively utilized as fully as possible, starting with the energy generator with the lowest marginal costs for the deviation from its individual roadmap. In the case of a negative control energy request, the energy generators with the highest savings are, insofar as possible, completely switched off accordingly. As a result, either the lowest additional costs for the provision of positive control energy or the greatest savings for the provision of negative control energy are achieved. One disadvantage of this mode of operation is that fully utilized or completely shut down energy generators can no longer respond in the event of further control energy requests and can therefore no longer contribute to the provision of control energy.

In terms of the time-optimized mode of operation, on the other hand, it can be provided that the control device in each case allocates a part of the maximum energy quantity providable by the respective energy generator or the group of energy generators to the first energy generator or the first group of energy generators and to the respective at least one further energy generator or the respective at least one further group of energy generators as the proportion of the control energy quantity to be provided, wherein the total required control energy quantity and the maximum energy quantity still providable by all energy generators to which no proportion of the control energy quantity has yet been allocated are used to determine this part.

With this mode of operation, steplessly controllable energy generators in particular contribute only a proportion of their individual providable control energy quantity, so that overall an even distribution of the control energy requirement among the energy generators is achieved. Since none of the energy generators is operated up to its load limit or is completely shut down and the proportion to be taken over for each energy generator is, as it were, already established before the distribution of the control energy quantity among the energy generators, all energy generators can respond more or less simultaneously (or at least very quickly in succession) to the control energy request. However, the disadvantage of this mode of operation is that energy generators with comparatively high energy generation costs or low savings contribute to the fulfillment of the control energy request.

In one further advantageous development of the inventive method according to the first embodiment, it is provided that a change rate specific to the respective energy generator, which indicates the value by which the energy quantity currently output by the respective energy generator can be changed within a predefined change time, is taken into account when the control energy quantity to be provided by the respective energy generator is defined.

In this development, account is advantageously taken of the fact that not all energy generators can change their mode of operation immediately, i.e. without a noticeable delay, in order to be able to provide a specific control energy quantity.

According to the development described, the speed at which the respective energy generators can respond to the control energy request is also taken into account when the individual proportions to be taken over are defined. Quickly responding energy generators can thus take over a larger proportion of the control energy quantity than comparably slowly responding energy generators within the same time period.

In a second preferred embodiment of the method according to the invention, it is provided that the energy generators are divided up into a first group of energy generators which are controllable in a stepwise manner and a second group of energy generators which are controllable in a stepless manner, the maximum energy quantity providable by the energy generators of the respective group is determined for each of the two groups, the control energy quantity is allocated to both groups according to a pre-distribution, the proportion of the control energy quantity allocated to the first group is distributed insofar as possible among the individual energy generators of the first group, wherein a remaining residual amount which is not distributable among the energy generators of the first group is added to the proportion of the control energy quantity which is allocated to the second group, and the proportion of the control energy quantity resulting from the addition is distributed among the individual energy generators of the second group.

This second embodiment is particularly suitable in cases where a more or less static allocation of the energy distribution costs can be assumed for the energy generators, since a sequence can then be specified in the selection of the energy generators. The particular advantage of this embodiment is that it can be executed entirely without loops, since a proportion of the control energy request involved in the pre selection is initially distributed among the stepwise-controllable energy generators and any residual amount of this proportion that is not coverable by the steplessly controllable energy generators is only thereafter taken over by the steplessly controllable energy generators together with the proportion of the control energy request involved in the pre selection for steplessly controllable energy generators. Due to this advantageous processing sequence involving first the stepwise-controllable and thereafter the steplessly controllable energy generators, the complete control energy request can be distributed among the energy generators in one execution of the method. At the same time, the most even possible utilization of the two groups of energy generators takes place.

In terms of this second embodiment, it can be provided according to one advantageous development that the proportion of the control energy quantity allocated to the respective group is selected in the pre-distribution proportionally to the maximum energy providable in total by the respective group.

In this way, on the one hand, an even utilization of the two groups is guaranteed, whereas, on the other hand, a proportion of the control energy which exceeds their capability to provide control energy is not allocated to either of the two groups.

In relation to the second embodiment, one further advantageous development provides that the proportions of the control energy quantity allocated to the respective group are allocated among the individual energy generators of the respective group in such a way that, in the case of a positive control energy quantity to be provided, those energy generators are preferentially selected in the case of which an increase in the energy generation in comparison with other energy generators of the same group incurs lower costs, and, in the case of a negative control energy quantity to be provided, those energy generators are preferentially selected in the case of which a reduction in the energy generation in comparison with other energy generators of the same group achieves higher cost savings.

This development of the method according to the second embodiment allows a cost-optimized use of the energy generators, provided that the cost situation is static, i.e. the cost-related ranking of the energy generators does not change over time.

A further advantageous development of the inventive method according to the second embodiment furthermore provides that, in defining the control energy quantity to be provided by the respective energy generators, a change rate specific to the respective energy generator, which indicates the value by which the energy quantity currently output by the respective energy generator can be changed within a predefined change time, is taken into account when the control energy quantity to be provided by the respective energy generator is defined.

In this development, in accordance with the first embodiment, the fact of different response speeds of the individual energy generators to a control signal requesting a change in their mode of operation is taken into account.

The aforementioned object is also achieved by a control device for controlling the operation of electric energy generators which are connectable to an electric energy supply network to feed in electric energy and of which the mode of operation is controllable via the control device, wherein the control device is configured to control the energy generators on the basis of a defined control characteristic in such a way that the energy fed by the energy generators into the supply network matches the planned energy requirement of the supply network, and the control device is configured to transmit control signals to the energy generators in response to the reception of a correction signal indicating a deviation of the current energy requirement of the supply network from the planned energy requirement of the supply network.

It is provided according to the invention that the control device has: means for determining a control energy quantity indicating an energy quantity to be provided jointly by all energy generators, on the basis of the correction signal, means for selecting a first energy generator or a first group of energy generators and for determining a proportion of the control energy which is to be provided by the first energy generator or the first group of energy generators, means for sequentially selecting further energy generators or further groups of energy generators and for determining a respective proportion of the respectively remaining amount of the control energy quantity which is to be provided by the respective further energy generator or the respective further group of energy generators until the amount of the control energy is allocated completely in each case to selected energy generators, and means for generating control signals for the selected energy generators which indicate the respective proportions of the control energy to be provided by the selected energy generators.

BRIEF DESCRIPTION OF THE SEVERAL VIEWS OF THE DRAWING

In terms of the advantages of the control device according to the invention, reference is made to the details described in relation to the method according to the invention. Since the control device according to the invention is additionally suitable for carrying out a method and its advantageous developments, all details described in relation to the method also apply accordingly to the control device. The invention is explained in detail below with reference to example embodiments, in respect of which.

DESCRIPTION OF THE INVENTION

Figure 1:
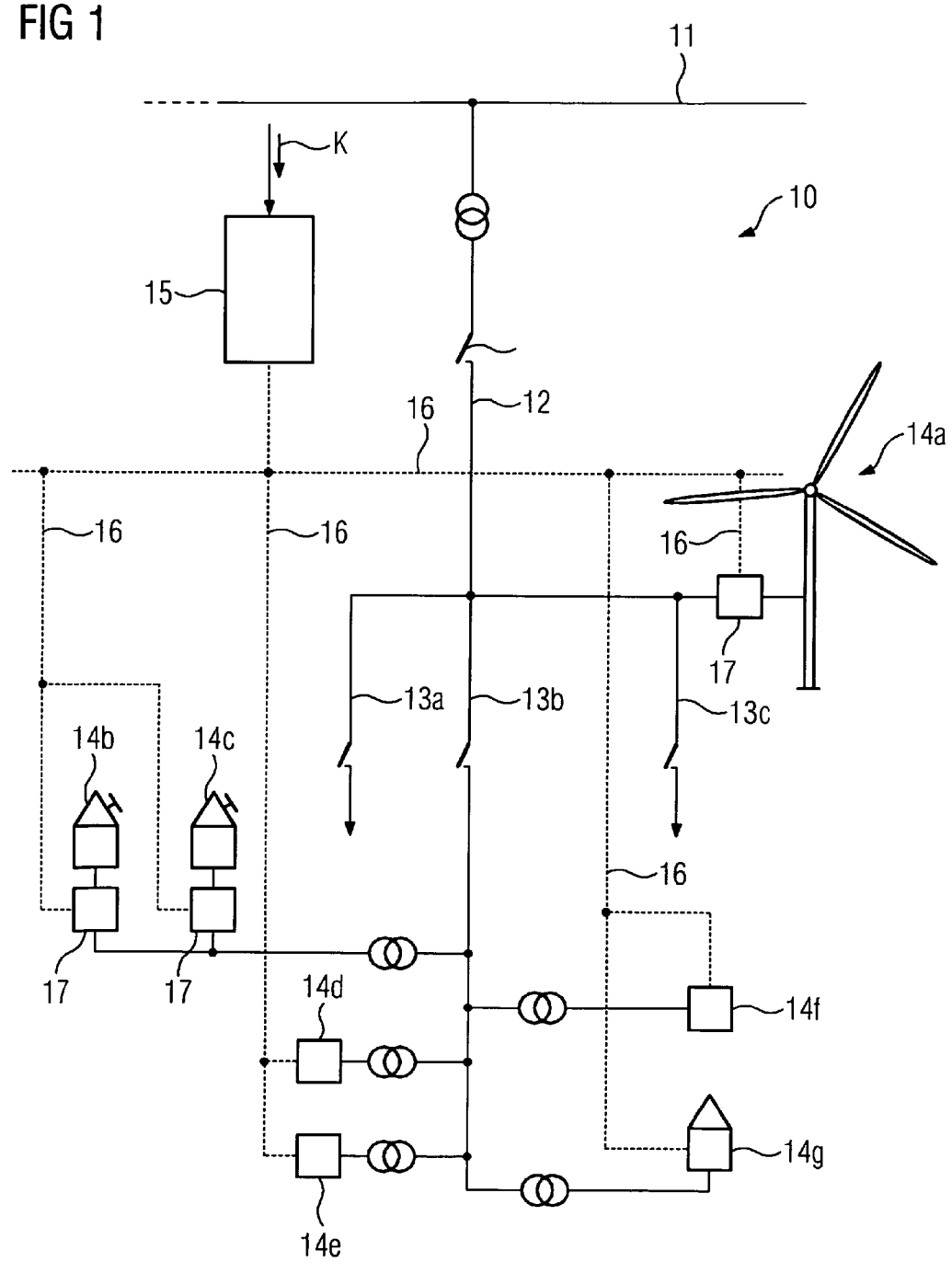
FIG. 1 shows a schematic view of a part of an electric energy supply network with a number of electric energy consumers and energy generators.

FIG. 1 shows a schematic view of a part 10 of an energy supply network not otherwise shown in detail. From a busbar 11, a branch line 12 goes off which is in turn divided into a plurality of branch lines 13*a-c*, of which only the branch line 13*b* is shown in detail in FIG. 1. A plurality of energy generators 14*a-g* are connected to the branch line 12 and the branch line 13*b*. In FIG. 1, the energy generators 14*a-g* represent examples of any given number of electric energy generators of which the mode of operation is controlled via a common control device 15. The energy generator 14*a* may specifically be, for example, a wind power plant, the energy generators 14*b* and 14*c* may be photovoltaic plants installed on residential buildings, the energy generator 14*g* may be a combined heat and power plant, and the energy generators 14*d-f* may be any other energy generators, for example biogas plants, small internal combustion plants or micro turbines. Energy generators of this type distributed in a decentralized manner compared with central high-capacity power plants normally have a substantially lower electrical performance and are therefore connected to the common control device 15 for the common control and distribution of their electric energy via communication connections 16 which may be designed as wireless or wired. Energy generators which have an integrated controller, in the present example the energy generators 14*d-g*, are connected via said controller directly to the control device; energy generators with no integrated controller can be connected via separate controllers 17. Such a network of energy generators is normally referred to as a virtual power plant. Here, the common control device 15 may, for example, be a data processing device of an energy management system.

The task of the control device 15 is to divide a control characteristic or "general roadmap" of the virtual power plant negotiated with the operator of the energy supply network into individual control characteristics or "individual roadmaps" which are allocated individually to each energy generator 14*a-g*. During the control in "normal operation", the individual energy generators 14*a-g* follow their predefined individual roadmap so that the virtual power plant adheres on the whole to the general roadmap in relation to the energy supply network.

A preplanned network operation cannot normally be entirely adhered to; unforeseen peaks or troughs in consumption therefore often result in deviations from the planned energy requirement of the network. For such cases, control energy reserves are normally made available by the energy generators connected to the energy supply network, said reserves being able to be used to compensate for such deviations. The deviations may occur in both a positive and a negative direction.

If a control requirement occurs, the network operator transmits a correction signal K to the control device 15, said signal indicating, on the one hand, the existence of a requirement for control energy and, on the other hand, the quantity and sign of the required control energy. In this case, the request is made to the control device 15 to respond within seconds so that the requested control energy quantity actually brings about a corresponding change, in its entirety, in the feed into the energy supply network within a short time, normally within a few minutes. The feed-in of control energy is therefore a process which is requested by the correction signal K, is overlaid over the normal general roadmap, and must be carried out within a short time span. To do this, the control device 15 must distribute the control energy quantity requested by the correction signal in a suitable manner among the energy generators 14*a-g*.

Whereas sufficient time is available for a complex optimization during the planning phase, i.e. during the definition of the general roadmap of the virtual power plant, the correction signal must be processed more or less in real time. In the case of control devices with moderate processing power, e.g. based on stored program control, the possibility of using the same algorithms as in the planning phase for optimum distribution does not often exist. For the short-term response to a correction signal K, the need therefore arises to indicate an algorithm that can be executed in an acceptable time even with control devices with moderate processing power and which nevertheless, insofar as possible, enables an optimum control of the energy generators 14*a-g*, i.e. adhering to specific predefined aspects.

Two examples of such algorithms are explained in detail below with reference to FIGS. 2 and 3. Algorithms of this type usually occur as device software and are executed by the control device during its operation.

Figure 2:
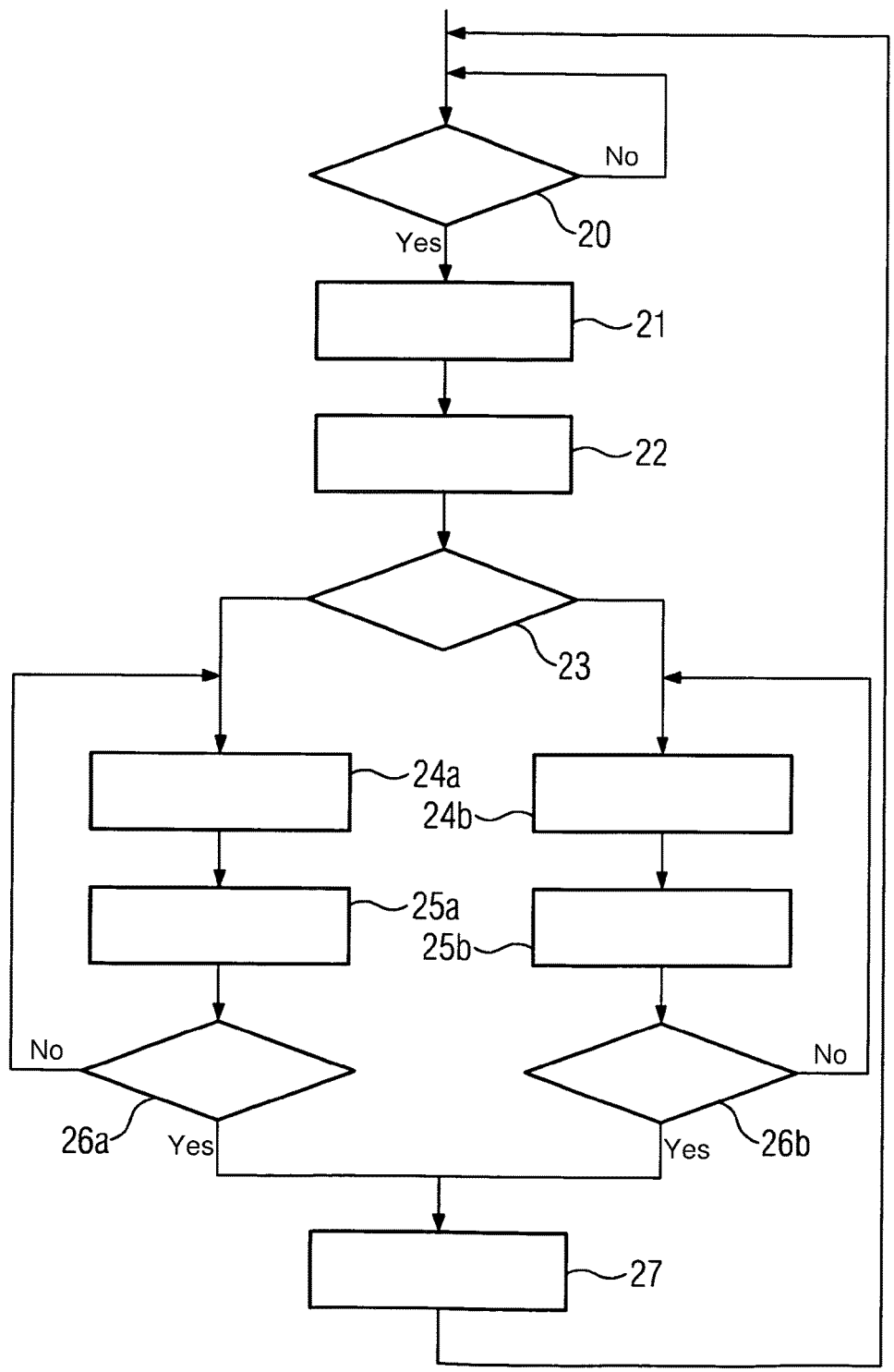
FIG. 2 shows a schematic flow diagram of a first example embodiment of a method for controlling the operation of electric energy generators.

FIG. 2 shows a flow diagram of a first example embodiment of a method which can be used by the control device 15 to control the operation of the energy generators 14*a-g* in response to a correction signal K.

In a first step 20, a check is carried out in order to establish whether a correction signal K is present on the control device 15. This first step 20 is carried out until the correction signal K is actually present. If the correction signal K is present, the energy generators 14 *a-g* are sorted in a following step 21 with the formation of a sequence list according to the respective costs that are incurred in the event of deviation from the roadmap-conformant operation of the respective energy generator 14*a-g*. Thus, for example, a specific quantity of additional fuel must be used for an increase in the energy quantity output by the combined heat and power plant 14*g*, which incurs additional costs, whereas, if sufficient wind is present, an increase in the energy quantity output by the wind power plant 14*a* is associated with comparably lower costs.

The maximum control energy quantity providable by all energy generators 14*a-g* is calculated in a next step 22. A distinction is made here between the possibilities for providing positive control energy (the capability to output more energy than specified according to the roadmap) and negative control energy (the capability to output less energy than specified according to the roadmap). To do this, the respective energy quantities are added according to their sign to produce a total providable control energy quantity.

In a following step 23, a strategy according to which the energy generators are to be operated in response to the correction signal is selected on the basis of an optimization parameter specified by the operator of the virtual power plant. On the one hand, a cost-optimized mode of operation and, on the other hand, a time-optimized mode of operation can be specified as the control strategy.

The control energy quantity is then distributed among the energy generators 14*a-g* in the sorted sequence arising from step 21. Steplessly controllable and stepwise-controllable energy generators can be used here in any combination, i.e. according to the present sorting.

If the cost-optimized mode of operation is specified, the method is continued at step 24*a*. In step 24*a*, the maximum control energy quantity providable by the first energy generator in the sequence list is distributed to said generator, i.e. in the case of a positive control energy quantity, the energy generator in question is utilized up to its maximum capacity, whereas, in the case of a negative control energy quantity, the energy generator in question is run down and, in the extreme case, even completely shut down. The sequence list is applied in ascending or descending order depending on the sign of the requested control energy quantity. In the case of a positive requested control energy quantity, the sequence list is applied in ascending order, starting with the energy generator which can provide the additional control energy at the lowest additional costs (or marginal costs). Conversely, in the case of a negative requested control energy quantity, the sequence list is applied in descending order, i.e. starting with the energy generator in the case of which a reduction in the output energy quantity is associated with the greatest cost saving.

In a following step 25a, the value of the requested control energy quantity still remaining after the allocation of the maximum possible control energy quantity to the first energy generator in step 24a is calculated as the difference between the originally requested control energy quantity and the proportion that has been allocated to the first energy generator. It can also be taken into account here that the energy generator in question cannot normally provide the complete value of its maximum providable control energy quantity immediately, but only in part within a time period acceptable for the control, e.g. 10 s or 1 min, so that only the proportion that the energy generator in question can achieve within the acceptable time period is subtracted from the requested control energy quantity in this step 25a. These circumstances will be discussed in detail later.

In the following step 26a, a check is carried out to establish whether the requested control energy quantity has already been completely allocated, i.e. whether the remaining value calculated in step 25a is equal to zero. If not, the method is continued once more at step 24a, wherein the next energy generator in the sequence list is selected for the allocation of control energy. The loop with steps 24a-26a is then carried out until the check in step 26a indicates that the entire requested control energy quantity has been distributed among the selected energy generators.

In this case, the method is concluded with step 27, in which the corresponding control signals comprising an indication of the proportion of the control energy quantity to be contributed by the respective selected energy generator are generated for the selected energy generators. The control signals are then transmitted to the corresponding energy generators and are implemented there.

If the time-optimized mode of operation is specified, the method is continued after step 23 at step 24b. In step 24b, only a part of the maximum control energy quantity providable by the first energy generator in the sequence list is distributed to said generator. This part is determined by generating a contribution factor which is calculated as a quotient from the requested control energy quantity and the quantity of control energy that is still providable by those energy generators to which no control energy has yet been allocated for takeover. This quantity of control energy that is still providable initially has the maximum value calculated in step 22, after which it in each case assumes the value calculated in step 25b (see following explanations). The contribution factor determined in this way normally (insofar as the requested control energy does not exceed the capacity of the energy generators for the provision of control energy) assumes a value between zero and 1 and is multiplied by the value of the control energy quantity providable by the energy generator currently selected in step 24b, and the proportion of the control energy quantity to be provided by the energy generator in question is thus defined. In the case of a positive control energy quantity, the energy generator in question is consequently utilized more, by the amount of this calculated proportion of its control energy reserve, whereas, in the case of a negative control energy quantity, the energy generator in question is run down by the corresponding proportion. The sequence list is applied in ascending or descending order depending on the sign of the requested control energy quantity. In the case of a positive requested control energy quantity, the sequence list is applied in ascending order, starting with the energy generator which can provide additional control energy at the lowest additional costs (or marginal costs). Conversely, in the case of a negative requested control energy quantity, the sequence list is applied in descending order, i.e. starting with the energy generator in the case of which a reduction in the output energy quantity is associated with the greatest cost saving.

In a following step 25b, the value of the requested control energy quantity still remaining after the allocation of the calculated proportion of the control energy quantity to the first energy generator in step 24b is calculated as the difference between the originally requested control energy quantity and the proportion that has been allocated to the first energy generator.

In the following step 26b, a check is carried out to establish whether the requested control energy quantity has already been completely allocated, i.e. whether the remaining value calculated in step 25b is equal to zero. If not, the method is continued once more at step 24b, wherein the next energy generator in the sequence list is selected here for the allocation of control energy. The loop with steps 24b-26b is then carried out until the check in step 26b indicates that the entire requested control energy quantity has been distributed among the selected energy generators.

In this case, the method is concluded with step 27, in which the corresponding control signals comprising an indication of the proportion of the control energy quantity to be contributed by the respective selected energy generator are generated for the selected energy generators. The control signals are then transmitted to the corresponding energy generators and are implemented there.

After step 27, the method resumes at step 20, in which a new correction signal is awaited.

By way of departure from the method described above, the control signals can also be generated and transmitted for both modes of operation in each case directly after the allocation of the respective proportion to be taken over to the respectively selected energy generator, i.e. immediately after step 24a or 24b.

In the case of the cost-optimized mode of operation, the respective selected energy generator contributes the possible maximum from its control energy reserve to cover the control energy request. The most economical mode of operation of the virtual power plant is thereby achieved, but this pushes those energy generators that can provide low-cost energy to their performance limits. In the case of the time-optimized mode of operation, each energy generator contributes only a proportion of its reserve which corresponds to the ratio of the request to the entire reserve that is still available. Since each energy generator takes over only a certain proportion of the request in this mode of operation, none of the energy generators is utilized up to the capacity limit (or, in the case of a negative control energy request, is completely shut down) and also keeps additional capacities available for further control energy requests.

The possibility of a combined form comprising both optimization approaches also essentially exists. First the time-optimized mode of operation can be used here to guarantee a fast response to the control energy request. Following the provision of the required control energy quantity, a changeover to a cost-optimized operation can be effected by replacing "expensive" energy generators with "low-cost" energy generators.

Figure 3:
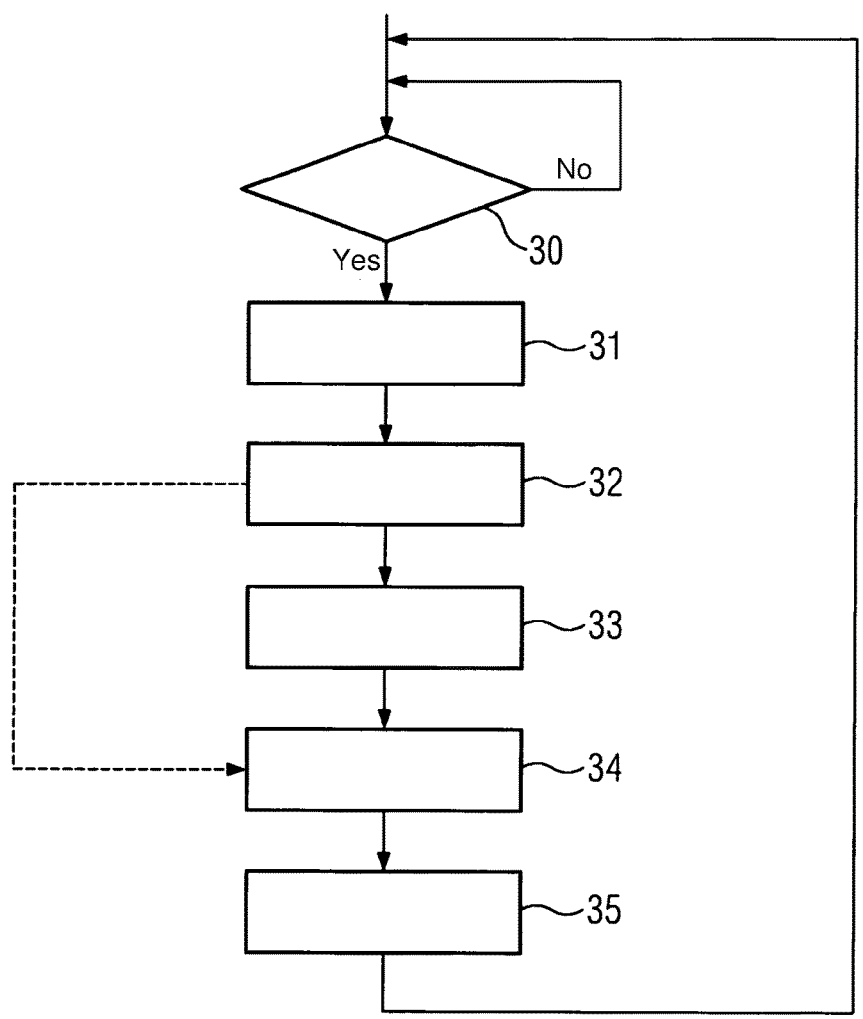
FIG. 3 shows a schematic flow diagram of a second example embodiment of a method for controlling the operation of electric energy generators.

FIG. 3 shows a flow diagram of a second example embodiment of a method which can be used by the control device 15 to control the operation of the energy generators 14a-g in response to a correction signal K.

In the first step 30, the presence of a correction signal K is checked. This step 30 is carried out until a request for control energy is actually indicated by a correction signal K. In this case, the method is continued at the following step 31.

In step 31, for a first group of energy generators comprising all stepwise-controllable energy generators, the maximum control energy providable by all energy generators of this first group is calculated. Similarly, in step 31, for a second group of energy generators comprising all steplessly controllable energy generators, the maximum control energy quantity providable by all energy generators of this second group is calculated. The calculation can be performed here for the two groups in any order one after the other or in parallel with one another.

In the calculation of the maximum control energy quantity providable by the energy generators of the two groups according to step 31, a distinction is made as in the first embodiment of the method also (cf. the details described in relation to FIG. 2) between a positive control energy request and a negative control energy request. Furthermore, as explained, the maximum control energy quantities providable by stepwise-controllable energy generators on the one hand and by steplessly controllable energy generators on the other hand are calculated separately. An example of the calculation of the maximum providable control energy quantity is explained below, which can be applied in a corresponding manner also to steps 22 and 25a/b of the first example embodiment according to FIG. 2 (for the first example embodiment, however, the maximum providable control energy is not calculated separately according to stepwise-controllable and steplessly controllable energy generators).

$P_{sched}$ denotes the feed-in energy quantity required from an energy generator in the current quarter of an hour according to its individual roadmap. $P_{max}$ denotes the maximum feed-in energy quantity that this energy generator can provide in the current quarter of an hour, while $P_{min}$ stands for the minimum feed-in energy quantity that this energy generator can provide in the current quarter of an hour. $P_{max}$ and $P_{min}$ may, for example, be derived from a generation forecast of the planning system. Furthermore, only those energy generators that are actually currently available for a control energy distribution are used for the calculation. For example, defective energy generators or energy generators undergoing maintenance are not taken into account in the calculation. The maximum providable positive control energy $P_{max+}$ and the maximum providable negative control energy quantity $P_{max-}$ of an energy generator are therefore calculated using the formulae $$P_{max+} = P_{max} - P_{sched}, \text{ and}$$

$$P_{max-} = P_{sched} - P_{min}.$$

The respective individual maximum providable control energy quantities of the individual energy generators are then determined for each of the two groups through addition, separated according to positive and negative control energy quantity.

A preliminary pre-distribution of the requested control energy quantity among the two groups of energy generators is undertaken in step 32. This pre-distribution may, for example, be carried out in such a way that the division takes place proportionally on the basis of the maximum providable control energy quantities calculated for the two groups, i.e. the control energy request is distributed roughly proportionally to the total control energy reserve present in the respective group. The most even possible use of the individual energy generators is thereby achieved. Alternatively, the pre-distribution can be carried out e.g. in such a way that the total control energy request is initially allocated to the stepwise-controllable energy generators. The control energy quantities determined for the second group of energy generators (the steplessly controllable energy generators) are transferred as shown in FIG. 3 by a broken line to a step 34 (see below).

In a next step 33, the control energy quantity provided for the first group is then divided up among the stepwise-switchable energy generators present in this group. The proportion of the control energy request allocated to this group cannot generally be exactly achieved due to the gradation of the respective generator outputs of the energy generators.

The residual amount of the control energy quantity allocated to the first group which cannot be covered by the energy generators of the first group is forwarded to the following step 34. In this step 34, the proportion resulting from the pre-distribution in step 32 for the steplessly controllable energy generators on the one hand and the residual proportion of the stepwise-controllable energy generators remaining in step 33 on the other hand are then added together and the resulting control energy quantity is distributed among the individual steplessly controllable energy generators of the second group.

The division of the remaining control energy request among the steplessly controllable energy generators is preferably effected so that each energy generator contributes the same proportion of its control energy reserve. As a result, the energy generators are evenly utilized and individual energy generators are not taken to the limits of their productive capacity. The maximum control speed of the virtual power plant as a whole is retained.

For the selection of the energy generators that are to be used in each case within the groups, a sequence list sorted according to the marginal costs of the energy generators in each group can be used, as in the first example embodiment also. This sequence list can be processed in ascending or descending order according to the sign of the control energy request.

In a concluding step 35, the corresponding control signals are generated for the individual energy generators and are transmitted to said generators. As already explained for the first embodiment, the generation and transmission of control signals can also be carried out in each case immediately after the definition of the proportion to be taken over in each case by the individual energy generator.

A possible procedure for defining the utilization of stepwise-controllable energy generators to be used is described below. This procedure can be used in both the first and second example embodiments of the explained method for controlling the operation of energy generators. A control module is allocated here to each output step of a stepwise-controllable energy generator. An energy generator that can be activated or deactivated in a single step only is in this context a special case of a stepwise-controllable energy generator. An output step of an energy generator can only be activated if the lower output steps are already activated. Similarly, an output step can only be deactivated if the higher output steps are already deactivated. The individual control modules are therefore interlinked in terms of their activation state. An output step of an energy generator can then be switched to a state deviating from the state specified by the individual roadmap of the energy generator in order to support the control energy request. If the output step supports the control energy request, the residual amount is left over from the original control energy request which can be forwarded to higher or lower output steps of the same energy generator or to other energy generators.

The control module of an output step first checks whether it is actually able or allowed to make a contribution to the requested control energy quantity by deviating from the individual roadmap of the energy generator. To do this, a check is first carried out to determine whether the current output step is released by the preceding steps. If so, a check is then carried out to determine whether the energy generator is allowed to deviate from its individual roadmap, i.e. whether the link between the forecast minimum and maximum output offers sufficient latitude for a change. Finally, a check is also carried out to determine whether a deviation from the individual roadmap, which can after all only take place in steps, would contribute to the attainment of the requested control energy quantity more precisely than currently. For example, this check produces a positive result even if the requested control energy quantity cannot be achieved precisely by connecting an output step, but instead is even exceeded, insofar as the resulting new deviation from the requested control energy quantity is smaller than the difference if the output step were further operated according to the original individual roadmap. If these checks produce a positive result, the corresponding output step is activated or deactivated.

Energy generators, irrespective of whether they can be controlled in a stepwise or stepless manner, cannot normally respond at any given speed to a changed reference value. Energy generators that are used for the provision of control energy can in some cases take minutes until a new reference value has been completely attained by descending a ramp. This sluggishness of the energy generators is normally included in the calculation in the form of a change rate. Instead of taking into account the maximum control energy contribution providable by an energy generator (in the long term) in its entirety, only the proportion that the energy generator can provide in an appropriate time period (e.g. 1 minute) should therefore be taken into account. As a result, the possibility exists that a control energy request is initially taken over at the required speed by the fastest plants, in order to be replaced later by lower-cost but sluggish generators.

To summarize, a method is thus described, in two possible embodiments, which undertakes an essentially sequential distribution of the control energy request among selected energy generators or groups of energy generators. The method can hereby be implemented comparatively simply using standard components (for example the ST ("Structured Text") programming language) and can be carried out in an advantageous manner even by control devices with moderate processing power. The method is suitable for controlling steplessly controllable and stepwise-controllable energy generators and achieves the most economical possible operation of the virtual power plant through the (dynamic or static) sorting of the energy generators according to their marginal costs.

The invention claimed is:

1. A method for controlling an operation of electric generators connected to an electric energy supply network to feed in electric energy and a mode of operation of the electrical generators being controlled via a common control device, the common control device controlling the energy generators using a defined characteristic such that the electrical energy fed into the supply network by the energy generators matches a planned energy requirement of the supply network, which comprises the steps of:
   feeding a correction signal indicating a deviation of a current energy requirement of the supply network from the planned energy requirement of the supply network to the common control device;
   transmitting, via the common control device, control signals to the energy generators, the correction signal being used to determine the control signals;
   determining, via the common control device, a control energy quantity indicating an energy quantity to be provided jointly by all of the energy generators, on a basis of the correction signal;
   selecting, via the common control device, a first energy generator or a first group of energy generators and determining a proportion of control energy to be provided by the first energy generator or the first group of energy generators;
   sequentially selecting, via the common control device, further energy generators or further groups of energy generators and determining a respective proportion of a respectively remaining amount of a control energy quantity which is to be provided by the further energy generator or the further group of energy generators until an amount of the control energy is allocated completely in each case to selected ones of the energy generators;
   generating, via the common control device, the control signals for the energy generators selected which indicate respective proportions of the control energy to be provided by the energy generators selected;
   dividing up the energy generators into a second group of energy generators which are controllable in a stepwise manner and a third group of enemy generators which are controllable in a stepless manner;
   determining a maximum energy quantity possible by the energy generators of each of the second and third groups of enemy generators;
   allocating the control enemy quantity to both the second and third groups of enemy generators according to a pre-distribution; and
   distributing the proportion of the control energy quantity allocated to the second group of enemy generators insofar as possible among the individual enemy generators of the second group of enemy generators, wherein a remaining residual amount which is not distributable among the enemy generators of the second group of energy generators is added to the proportion of the control energy quantity which is allocated to the third group of energy generators, and the proportion of the control enemy quantity resulting from the addition is distributed among the individual enemy generators of the third group of enemy generators.

2. The method according to in claim 1, wherein in order to determine a sign of the control energy quantity, the common control device examines the correction signal to determine whether the correction signal indicates a positive or negative deviation of the current energy requirement of the supply network from the planned energy requirement of the supply network.

3. The method according to claim 1, which further comprises:
   sorting the energy generators via the common control device for forming a sequence list relating to costs incurred if the energy generators are operated deviating from a control characteristic specific to each of the energy generators defined on a basis of the control characteristic; and using the sequence list to select the first energy generator or the first group of energy generators and the at least one further energy generator or the at least one further group of energy generators.

4. The method according to claim 3, which further comprises defining, via the common control device, a maximum control energy quantity possibly provided in total by the energy generators as a sum of respective individual control energy quantities provided by each individual one of the energy generators.

5. The method according to claim 3, which further comprises generating, via the common control device, the control signals depending on an optimization parameter specified by a user according to a cost-optimized or according to a time-optimized mode of operation.

6. The method according to claim 5, wherein in a case of a cost-optimized mode of operation, the common control device in each case allocates a maximum energy quantity possible by a respective energy generator or a respective group of the energy generators to the first energy generator or the first group of energy generators and to the further energy generator or the further groups of energy generators as the proportion of the control energy quantity to be provided.

7. The method according to claim 5, wherein in a case of a time-optimized mode of operation, the common control device in each case allocates a part of a maximum energy quantity possible by the respective energy generator or a respective group of energy generators to the first energy generator or the first group of energy generators and to the further energy generator or the further group of energy generators as the proportion of the control energy quantity to be provided, wherein a total required control energy quantity and the maximum energy quantity still providable by all of the energy generators to which no proportion of the control energy quantity has yet been allocated are used to determine the part.

8. The method according to claim 3, wherein a change rate specific to a respective energy generator, which indicates a value by which the energy quantity currently output by the respective energy generator can be changed within a predefined change time, is taken into account when the control energy quantity to be provided by the respective energy generator is defined.

9. The method according to claim 1, wherein in the pre-distribution, the proportion of the control energy quantity allocated to the second and third groups of energy generators is selected proportionally to the maximum energy providable in total by the respective group.

10. The method according to claim 1, which further comprises allocating the proportions of the control energy quantity allocated to the second and third group of energy generators among the individual energy generators of the second and third groups of energy generators in such a way that, in a case of a positive control energy quantity to be provided, the energy generators that are preferentially selected in a case of which an increase in the energy generation in comparison with other energy generators of a same group incurs lower costs, and, in the case of a negative control energy quantity to be provided, the energy generators that are preferentially selected in the case of which a reduction in the energy generation in comparison with other energy generators of the same group achieves higher cost savings.

11. The method according to claim 1, wherein a change rate specific to the respective energy generator, which indicates a value by which the energy quantity currently output by the respective energy generator can be changed within a predefined change time, is taken into account when the control energy quantity to be provided by the respective energy generator is defined.

12. A control device for controlling an operation of electric energy generators connected to an electric energy supply network to feed in electric energy and of which a mode of operation is controllable via the control device, the control device programmed to:

control the energy generators on a basis of a defined control characteristic such that the electrical energy fed by the electric energy generators into the supply network matches a planned energy requirement of the supply network;

transmit control signals to the electric energy generators in response to a reception of a correction signal indicating a deviation of a current energy requirement of the supply network from the planned energy requirement of the supply network;

determine a control energy quantity indicating an energy quantity to be provided jointly by all the electric energy generators, on a basis of the correction signal;

select a first energy generator or a first group of energy generators and determine a proportion of the control energy quantity which is to be provided by the first energy generator or the first group of energy generators;

sequentially select further energy generators or further groups of energy generators and determine a respective proportion of the respectively remaining amount of the control energy quantity which is to be provided by the further energy generator or the further group of energy generators until the amount of the control energy is allocated completely in each case to selected ones of the energy generators;

generate further control signals for selected energy generators indicating respective proportions of the control energy quantity to be provided by the selected energy generators;

divide up the energy generators into a second group of energy generators which are controllable in a stepwise manner and a third group of enemy generators which are controllable in a stepless manner;

determine a maximum energy quantity possible by the energy generators of each of the second and third groups of enemy generators;

allocate the control enemy quantity to both the second and third groups of enemy generators according to a pre-distribution; and distribute the proportion of the control energy quantity allocated to the second group of enemy generators insofar as possible among the individual enemy generators of the second group of enemy generators, wherein a remaining residual amount which is not distributable among the enemy generators of the second group of energy generators is added to the proportion of the control energy quantity which is allocated to the third group of energy generators, and the proportion of the control enemy quantity resulting from the addition is distributed among the individual enemy generators of the third group of enemy generators.

* * * * *